United States Patent Office 2,851,466
Patented Sept. 9, 1958

2,851,466
SUBSTITUTED POLYAMINES

Otis E. Fancher, Elkhart, Ind., assignor to Miles Laboratories, Inc., Elkhart, Ind., a corporation of Indiana No Drawing. Application February 4, 1955
Serial No. 486,271

5 Claims. (Cl. 260—340.5)

This invention relates to a group of compounds having amebacidal properties and physiological activity as hypotensives. More particularly, the invention relates to substituted polyamines having the formula

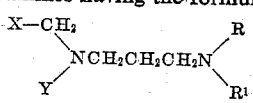

and acid addition salt thereof wherein R and $R^1$ represent lower alkyl, X is a member of the group consisting of alkyl, dialkylaminopropyl and methylenedioxyphenyl, and Y represents a member of the group consisting of hydrogen, alkyl and acyl.

The compounds are prepared in two steps, the first of which is represented by

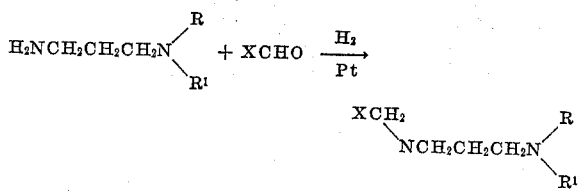

with acylation to introduce Y as acyl in the second step employing either acyl chlorides or acid anhydrides which in chemical behavior closely resemble the acyl chlorides. Alternatively, where Y represents alkyl, methylation as the second step is accomplished using formaldehyde and formic acid as shown:

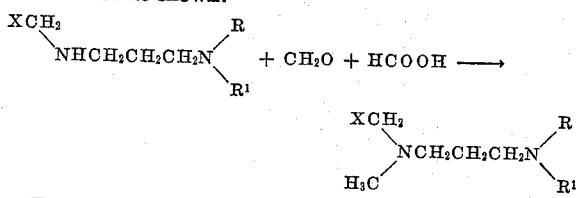

Further description of the invention is to be found in the subsequent examples which describe illustrative species of compoundes contemplated by the generic formula.

EXAMPLE I

γ-Diethylaminopropyl-isobutylamine 39 g. (0.3 mole) of γ-diethylaminopropylamine, 21.6 g. (0.3 mole) of isobutyraldehyde, 120 ml. of absolute alcohol and 0.5 g. of platinum oxide were shaken with hydrogen at an initial pressure of 57 lb./in.² until absorption of hydrogen ceased. Distillation of the reaction mixture gave 45 g. of product, B. P.$_3$ 88–89°.

EXAMPLE II

N - isobutyl - N - (γ - diethylaminophoply) acetamide hylrochloride

This was obtained as a hydroscopic solid by acetylation of the product of Example I with acetyl chloride in benzene. Percent Cl found 12.81 as compared to theoretical for $C_{13}H_{29}ClN_2O$ of 13.39%.

EXAMPLE III

N,N-di-(γ-diethylaminopropyl)acetamide dihydrochloride

Di-(γ-diethylaminopropyl)amide (24.3 g., 0.1 mole) and 10.5 g. (0.103 mole) of acetic anhydride in 50 ml. of benzene were refluxed for two hours. The reaction mixture was cooled and treated with an excess of ethereal-HCl. The brown syrup which separated was dissolved in a mixture of ethyl acetate and absolute alcohol and let stand overnight. The amorphous solid which separated was recrystallized from a mixture of ethyl acetate and isopropanol as rosettes of short needles melted at 114–116°. Percent Cl found 19.78; calculated for $C_{16}H_{37}Cl_2N_3O$—19.80%.

EXAMPLE IV

N-(γ-di-n-propylaminopropyl)piperonylamine

In a reaction bottle were mixed 15.8 g. (0.1 mole) of γ-di-n-propylaminopropylamine and 15 g. (0.1 mole) of piperonal in 150 ml. of absolute ethanol and hydrogenated at an initial hydrogen pressure of 56 lb. using 0.3 g. of platinum oxide catalyst. Distillation of the filtered reaction mixture gave 20.5 g. of product B. P.$_{.15}$ 216–221°. This was converted to the hydrochloride which was crystallized from ethyl acetate and absolute alcohol. This melted at 173–175°. Percent Cl found 19.70; calculated for $C_{17}H_{30}Cl_2N_2O_2$—19.96%.

EXAMPLE V

N - (γ - di - n - propylaminopropyl) - N - methylpiperonylamine

N - (γ - di - n - propylaminopropyl)piperonylamine (15.12 g., 0.0516 mole), 4.6 g. (0.0568 mole) of 37% formaldehyde and 6 g. (0.129 mole) of 98–100% formic acid were mixed and heated in a boiling water bath for seven hours. The reaction mixture was poured into an excess of aqueous NaOH and the amine was extracted with ether and dried. The hydrochloride was precipitated by the addition of alcoholic-HCl and crystallized from a mixture of ethyl acetate and isopropanol. Percent Cl found 18.91; calculated for $C_{18}H_{33}Cl_2N_2O_2$—18.64%.

EXAMPLE VI

N,N-di-(γ-diethylaminopropyl)-p-nitrobenzamide
·2HCl 13 g. of p-nitrobenzoyl chloride (0.07 mole) was dissolved in 50 ml. of anhydrous benzene. 16.3 g. (0.07 mole) of di-(γ-diethylaminopropyl)amine was added and the mixture was heated for fifteen minutes. The solid which separated on cooling was crystallized from isopropanol and had a melting point of 248–249°. Percent Cl found 15.32; calculated for $C_{21}H_{38}Cl_2N_4O_3$—15.26%.

EXAMPLE VII

N,N-di-(γ-di-n-propylaminopropyl)-p-nitrobenzamide·2HCl

N,N - Di - (γ - di - n - propylaminopropyl) - p - nitrobenzamide dihydrochloride was prepared in the manner described in Example VI above. This compound exhibited a melting point of 194–195°. Percent Cl found was 13.94 as compared to theoretical for $C_{25}H_{46}Cl_2N_4O_3$ of 13.60%.

EXAMPLE VIII

N,N-di-(γ-di-n-propylaminopropyl)methylamine
·3HCl 28 g. (0.094 mole) of di-(γ-di-n-propylaminopropyl) amine, 15.3 g. (0.188 mole) of 37% formalin and 60 ml. of absolute alcohol were hydrogenated at an initial hydrogen pressure of 57 lb. using 0.5 g. of platinum oxide catalyst. Distillation gave 18.5 g. of product B. P.$_{.1.5}$ 142–143°. Treatment with ethereal-HCl precipitated the trihydrochloride which was crystallized from a mixture of ethyl acetate and isopropanol. This compound exhibited a melting point of 172–173°. Percent Cl found 25.33; calculated for $C_{19}H_{46}Cl_3N_3$—25.15%.

EXAMPLE IX

*N-(γ-di-n-butylaminopropyl)piperonylamine·2HCl*

This was prepared by the procedure of Example VI using γ-di-n-butylaminopropylamine and had a melting point of 156°. Percent Cl found 17.72; calculated for $C_{19}H_{34}Cl_2N_2O_2$.

EXAMPLE X

*N-(γ-di-n-butylaminopropyl)-N-methylpiperonylamino·2HCl*

Methylation of the free base of the preceding example according to the procedure of Example VI gave a product which was crystallized from a mixture of ethyl acetate and absolute alcohol. This compound exhibited a melting point of 195–198°. Percent Cl found 17.46; calculated for $C_{20}H_{36}Cl_2N_2O_2$—17.41%.

In addition to the hydrochlorides specifically developed in the foregoing examples, other such addition salts can be prepared with other acids in conformity with well established procedures in the art. Accordingly, having thus described my invention, I claim:

1. N - (γ - di - n - propylaminopropyl)piperonylamine having the formula

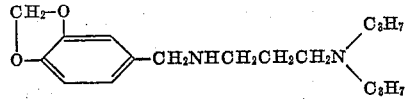

2. N - (γ - di - n - butylaminopropyl) - N - methylpiperonylamine having the formula

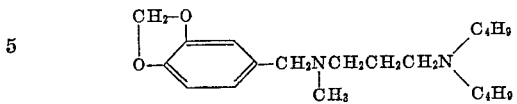

3. N - (γ - di - n - propylaminopropyl) - N - methylpiperonylamine.

4. N-(γ-di-n-butylaminopropyl) piperonylamine.

5. A compound selected from the group consisting of substituted polyamines having the formula:

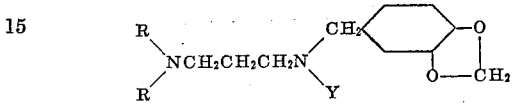

wherein R is lower alkyl and Y is selected from the group consisting of hydrogen and methyl, and acid addition salts of said substituted polyamines.

References Cited in the file of this patent

UNITED STATES PATENTS

| | | |
|---|---|---|
| 2,553,093 | Jacob et al. | May 15, 1951 |
| 2,644,003 | Gysin et al. | June 30, 1953 |
| 2,716,134 | Reynolds et al. | Aug. 23, 1955 |

OTHER REFERENCES

Annals des Chemie, vol. 6, Series 12, page 855.